United States Patent
Liu

(10) Patent No.: US 11,295,541 B2
(45) Date of Patent: Apr. 5, 2022

(54) METHOD AND APPARATUS OF 360 DEGREE CAMERA VIDEO PROCESSING WITH TARGETED VIEW

(71) Applicant: TENCENT AMERICA LLC, Palo Alto, CA (US)

(72) Inventor: Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 295 days.

(21) Appl. No.: 16/274,913

(22) Filed: Feb. 13, 2019

(65) Prior Publication Data

US 2020/0257918 A1    Aug. 13, 2020

(51) Int. Cl.

| | |
|---|---|
| G06V 10/25 | (2022.01) |
| G06T 9/00 | (2006.01) |
| G06T 7/11 | (2017.01) |
| G06T 7/187 | (2017.01) |
| G06T 7/174 | (2017.01) |
| G06T 7/194 | (2017.01) |

(52) U.S. Cl.
CPC .............. G06V 10/25 (2022.01); G06T 7/11 (2017.01); G06T 7/174 (2017.01); G06T 7/187 (2017.01); G06T 7/194 (2017.01); G06T 9/00 (2013.01); *G06T 2207/10016* (2013.01)

(58) Field of Classification Search
CPC ...... G06K 9/3233; G06K 9/4642; G06T 9/00; G06T 7/11; G06T 7/187; G06T 7/174; G06T 7/194; G06T 2207/10016; G06T 3/0043; H04N 19/597; H04N 19/503; H04N 19/593; H04N 19/61; H04N 19/162; H04N 19/167; H04N 19/17; G06V 10/25; G06V 10/50

See application file for complete search history.

(56) References Cited

U.S. PATENT DOCUMENTS

| | | | | |
|---|---|---|---|---|
| 5,287,203 | A * | 2/1994 | Namizuka | ................ H04N 1/40 358/401 |
| 6,498,868 | B1 * | 12/2002 | Klassen | ................ G06T 3/0056 348/453 |
| 8,994,785 | B2 * | 3/2015 | Seo | .................... H04N 5/23238 348/36 |
| 9,959,601 | B2 * | 5/2018 | Zeng | ...................... H04N 5/232 |
| 10,075,618 | B2 * | 9/2018 | Erdler | ................ H04N 5/23219 |
| 10,951,874 | B2 * | 3/2021 | Chen | .................. H04N 21/2353 |
| 2006/0017807 | A1 * | 1/2006 | Lee | .......................... B60R 1/00 348/36 |
| 2007/0237224 | A1 * | 10/2007 | Krishnan | ................ H04N 19/61 375/240.12 |
| 2007/0296817 | A1 * | 12/2007 | Ebrahimi | ......... G08B 13/19686 348/161 |
| 2008/0193042 | A1 * | 8/2008 | Masuda | ................ G06T 3/0062 382/275 |

(Continued)

*Primary Examiner* — Xuemei G Chen
(74) *Attorney, Agent, or Firm* — Sughrue Mion, PLLC

(57) ABSTRACT

A method of and an apparatus for processing a 360 degree video are provided. The method includes determining an interest object in the 360 degree video, based on user information indicating the interest object, determining a target viewing area around the interest object, in the 360 degree video, and processing the target viewing area while refraining from processing a remaining viewing area excluding the target viewing area, in the 360 degree video.

16 Claims, 15 Drawing Sheets

(56) References Cited

U.S. PATENT DOCUMENTS

| | | | |
|---|---|---|---|
| 2009/0041378 A1* | 2/2009 | Yamaoka | H04N 5/2628 382/275 |
| 2010/0002070 A1* | 1/2010 | Ahiska | H04N 5/232945 348/36 |
| 2012/0182155 A1* | 7/2012 | Sato | B25J 9/1674 340/686.6 |
| 2013/0039409 A1* | 2/2013 | Gupta | G06T 7/215 375/240.02 |
| 2013/0176208 A1* | 7/2013 | Tanaka | G06F 3/013 345/156 |
| 2013/0286218 A1* | 10/2013 | Tsuji | H04N 5/23296 348/169 |
| 2014/0292642 A1* | 10/2014 | Schubert | G06T 19/006 345/156 |
| 2015/0016746 A1* | 1/2015 | Tsubota | G06T 3/00 382/275 |
| 2015/0109401 A1* | 4/2015 | Kasatani | G06T 5/006 348/14.07 |
| 2017/0345162 A1* | 11/2017 | Bamba | G06K 9/00718 |
| 2017/0345205 A1* | 11/2017 | Lai | G06T 15/205 |
| 2017/0366814 A1* | 12/2017 | Adsumilli | H04N 19/597 |
| 2018/0025478 A1* | 1/2018 | Lee | G06T 5/50 382/284 |
| 2018/0061363 A1* | 3/2018 | Lee | G06T 3/40 |
| 2018/0091735 A1* | 3/2018 | Wang | H04N 19/597 |
| 2018/0103196 A1* | 4/2018 | Lee | H04N 5/44504 |
| 2018/0109810 A1* | 4/2018 | Xu | H04N 19/11 |
| 2018/0109817 A1* | 4/2018 | Wang | H04N 21/234318 |
| 2018/0199042 A1* | 7/2018 | Wang | H04N 19/597 |
| 2018/0220156 A1* | 8/2018 | Kim | G06T 3/0093 |
| 2018/0343435 A1* | 11/2018 | Mizuno | G06T 3/0018 |
| 2019/0031206 A1* | 1/2019 | Lang | B60R 1/00 |
| 2019/0197660 A1* | 6/2019 | Kogure | G06K 9/46 |
| 2019/0347766 A1* | 11/2019 | Kawaguchi | H04N 5/23238 |
| 2019/0347775 A1* | 11/2019 | Su | G06T 5/50 |
| 2020/0151487 A1* | 5/2020 | Yonezawa | H04N 19/176 |
| 2020/0250412 A1* | 8/2020 | Suzuki | G06K 9/00369 |
| 2020/0250454 A1* | 8/2020 | Croxford | H04N 19/167 |
| 2021/0142452 A1* | 5/2021 | Saa-Garriga | G06T 5/006 |
| 2021/0168363 A1* | 6/2021 | Matsumoto | H04N 19/70 |
| 2021/0218890 A1* | 7/2021 | Song | G06T 15/205 |

* cited by examiner

METHOD AND APPARATUS OF 360 DEGREE CAMERA VIDEO PROCESSING WITH TARGETED VIEW

BACKGROUND

1. Field

Methods and apparatuses consistent with embodiments relate to image and video coding and decoding, and more specifically, a method and an apparatus of 360 degree camera video processing with a targeted view.

2. Description of Related Art

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques in which an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

Video coding according to the above technologies, historically, has often assumed input content captured from a single camera. Other content that has attracted attention is known as stereoscopic content: two camera signals from cameras spatially aligned such that the axis of capture is approximately parallel, when combined in a suitable renderer, can provide the illusion of a three-dimensional picture when viewed under certain conditions. As the camera signals are highly correlated, certain video coding technologies have been devised that correlate the two signals to obtain a coding efficiency higher than what the coding efficiency could be when both signals were coded individually. One of such technologies is known as multiview coding, as available in the form of profiles in both H.264 and H.265. In some cases, such multiview coding can be extended to the combined coding of more than two camera signals, while still leveraging the similarity, if any, of the multiple camera signals. However, multiview coding in the aforementioned sense still operates on planar camera images.

Recently, input devices have become available that include potentially many cameras at capture angles that are not parallel. To the extent possible based on the physical layout, those input devices allow to capture a spherical volume of space. Such cameras may be marketed, and are referred to herein, as "360 cameras", as they may capture a 360 degree field of view in all dimensions. Still image 360 cameras may operate by using a pan-tilt camera head that mounts a single camera with a lens that may capture a comparatively wide angle. By rotating both axis of the pan-tilt head to certain positions before taking a shot, a sequence of still images can be captured by the camera in such a way that the individual still images overlap to some extent. Using geometric information consistent with the control information used to control the pan tilt camera head, these images can be geometrically corrected and stitched together to form a planar image that can be input into traditional image processing technologies, for example for the purpose of compression and transmission. The geo-correction and stitching process is referred to herein as "projection". Rendering a 360 image can involve the selection of a viewpoint or viewing direction pertaining to the 360 captured scene, reverse geometric correction, de-stitching, etc., to create a planar image suitable for viewing. The reverse geometric correction and de-stitching is referred to herein as "de-projection" or "inverse projection". Ideally, the scene depicted in that image would be the same as if a planar image would have been captured in the viewing direction or from the selected viewpoint.

Above concept can be extended to the capture of video, as video can be represented by a series of still images captured and rendered in sufficiently short time intervals. 360 video capable cameras are commercially available in two basic variants. A first variant uses a rapidly rotating camera head with one or more cameras and appropriate lenses arranged such that, over the course of one rotation, a 360 degree scene (in one dimension) can be shot. The one or more cameras and lenses may be arranged such that the other dimension is covered. To obtain a frame rate of, for example 60 frames per second, the camera head has to rotate at, for example, a minimum of 3600 revolutions per minute. To avoid camera blur, the capture time of the cameras may have to be selected very short, which may limit the number photons the camera sensors are exposed to, leading to noisy images, need of high illumination of the scene, or both. Other implementations can omit the mechanically critical rotating head through the use of many cameras and appropriate lenses that are arranged such that the overlapping view of all cameras and lenses captures the whole 360 degree sphere, avoiding the aforementioned problems at the additional cost of requiring many more cameras and lenses. Mixing forms of the two concepts are also possible. Due to the decreasing cost of electro-optical components relative to mechanical components, there appears to be a trend away from mechanical 360 cameras towards multi-lens cameras. Further, some designs omit the capture in certain, often relatively narrow, capture angles based on the understanding that the 360 camera, being a physical device, may need to be mounted somewhere, and that the mounting hardware is likely of limited interest to the viewers. Like in the still camera above, many 360 capable cameras geometrically project the images (captured in the same instant in time, or nearly so in case of a rotating head) together so to form a series of projected images representing a 360 degree view of the camera.

The projection of an image representing a spherical capture scene onto a planar surface has been a known and well-studied problem for centuries. One well-known projection is, for example, the Mercator projection, introduced in 1569, which is a cylindrical projection and still in use in many maps of the world. Since then, many other projections have been devised, including, for example, equirectangular projection, conic projection, Aitoff projection, Hammer projection, Plate Carree projection, and so forth. Referring to FIG. 1, shown are a few (of many) projections that may be suitable for the mapping of spherical capture scene onto a planar surface, and have been studied in the context of 360 degree video compression. Shown is a globe (101), with three projections to a planar map of the globe. The first projection is known as equirectangular projection (102). The second projection is a cubical projection, wherein the surface of the globe is projected on six square, flat, square surfaces that represents the six directions at 90 degree displacement in each dimension. The six squares can be arranged on a single planar surface, resulting in a cube map (103). The arrangement of the surfaces of the cube in the planar surface presented here is one of several options. Finally, an icosahedronal projection projects the globe's surface on the surface of an icosahedron (104) (a three-dimensional symmetric geometric figure composed of 20 triangular flat surfaces), and those 20 triangular surfaces can be arranged on a single planar surface (105). Again, many sensible options exist for the spatial allocation of the 20 triangular surfaces on the single planar surface (105).

These, and other suitable projection formats attempt to map a spherical surface to a planar surface. The planar representation necessarily cannot be a mathematically correct representation of the geometric features of the sphere, but rather an approximation that has a certain amount of error. Where, spatially, that error is located and how big it can become depends on the nature of the projection. For example, it is well known that the equidistant projection significantly overstates longitudal distances at latitudes far away from the equator. For example, in an equidistant projected map of the world, the island of Greenland is depicted larger than the continent of Australia, although in reality it has only about $\frac{1}{3}^{rd}$ of the surface area.

Existing 360 degree cameras can capture "photo sphere" images/videos with all 360 degrees in three dimensions. A live stream of such a video may require the entire 360 degree photo sphere video data be encoded and then transmitted. This allows users to interactively select and change a specific viewing angle for the video during playback.

At high resolution, the bandwidth required for transmission of a 360 degree video may be significant. Additionally, photo sphere images may often be distorted during playback. Distortions such as a barrel distortion and a fisheye effect can affect wide angle views, and similarly can impact 360 degree videos and images. Particularly, the barrel distortion and the fisheye effect may be dependent upon camera to object distance. To correct such distortions, an image processing system may need to apply image correction properly based upon a camera to object distance, especially at short distances. If the correction is applied based upon incorrect camera to object distance, the image can appear distorted. Also, if the image includes multiple objects at different camera to object distances, correcting distortion for one camera to object distance may leave some objects (e.g., in the foreground) distorted. This makes transmission and viewing difficult and unpleasant, especially in live video conferencing or in specific applications in which a remote viewer is only interested in viewing a specific person or object of interest, for example, a parent is viewing a video of a child in a day care facility.

SUMMARY

According to embodiments, a method of processing a 360 degree video is performed by at least one processor and includes determining an interest object in the 360 degree video, based on user information indicating the interest object, determining a target viewing area around the interest object, in the 360 degree video, and processing the target viewing area while refraining from processing a remaining viewing area excluding the target viewing area, in the 360 degree video.

According to embodiments, an apparatus for processing a 360 degree video includes at least one memory configured to store computer program code, and at least one processor configured to access the at least one memory and operate according to the computer program code. The computer program code includes first determining code configured to cause the at least one processor to determine an interest object in the 360 degree video, based on user information indicating the interest object, second determining code configured to cause the at least one processor to determine a target viewing area around the interest object, in the 360 degree video, and processing code configured to cause the at least one processor to process the target viewing area while refraining from processing a remaining viewing area excluding the target viewing area, in the 360 degree video.

According to embodiments, a non-transitory computer-readable storage medium storing instructions that cause a processor to determine an interest object in the 360 degree video, based on user information indicating the interest object, determine a target viewing area around the interest object, in the 360 degree video, and process the target viewing area while refraining from processing a remaining viewing area excluding the target viewing area, in the 360 degree video.

DETAILED DESCRIPTION

Methods of and apparatuses for processing of 360 degree video are provided. In detail, a 360 degree video having a high resolution and a wide view angle is converted to a video of a targeted view area that is focused on a person and/or an object of interest, with a lower resolution, and then broadcasted. Such processing allows transmission of the video to occur without utilizing significant bandwidth.

That is, to reduce a transmission bandwidth requirement of a live video feed, 360 degree video data can be processed to focus on a specific target area, based upon one or more persons or objects of interest.

Figure 1:
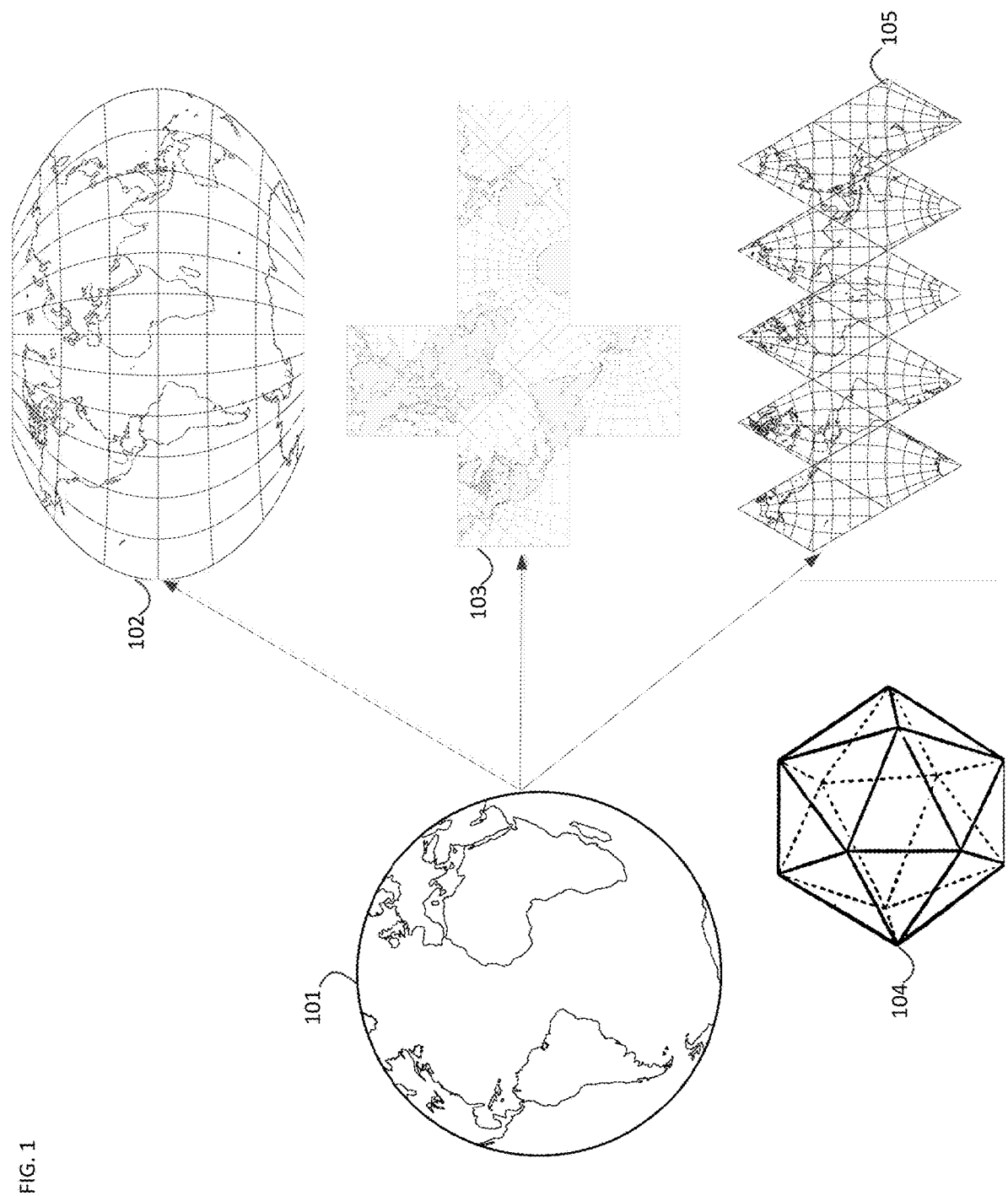
FIG. 1 is a schematic illustration of several projections in accordance with prior art.
Figure 2:
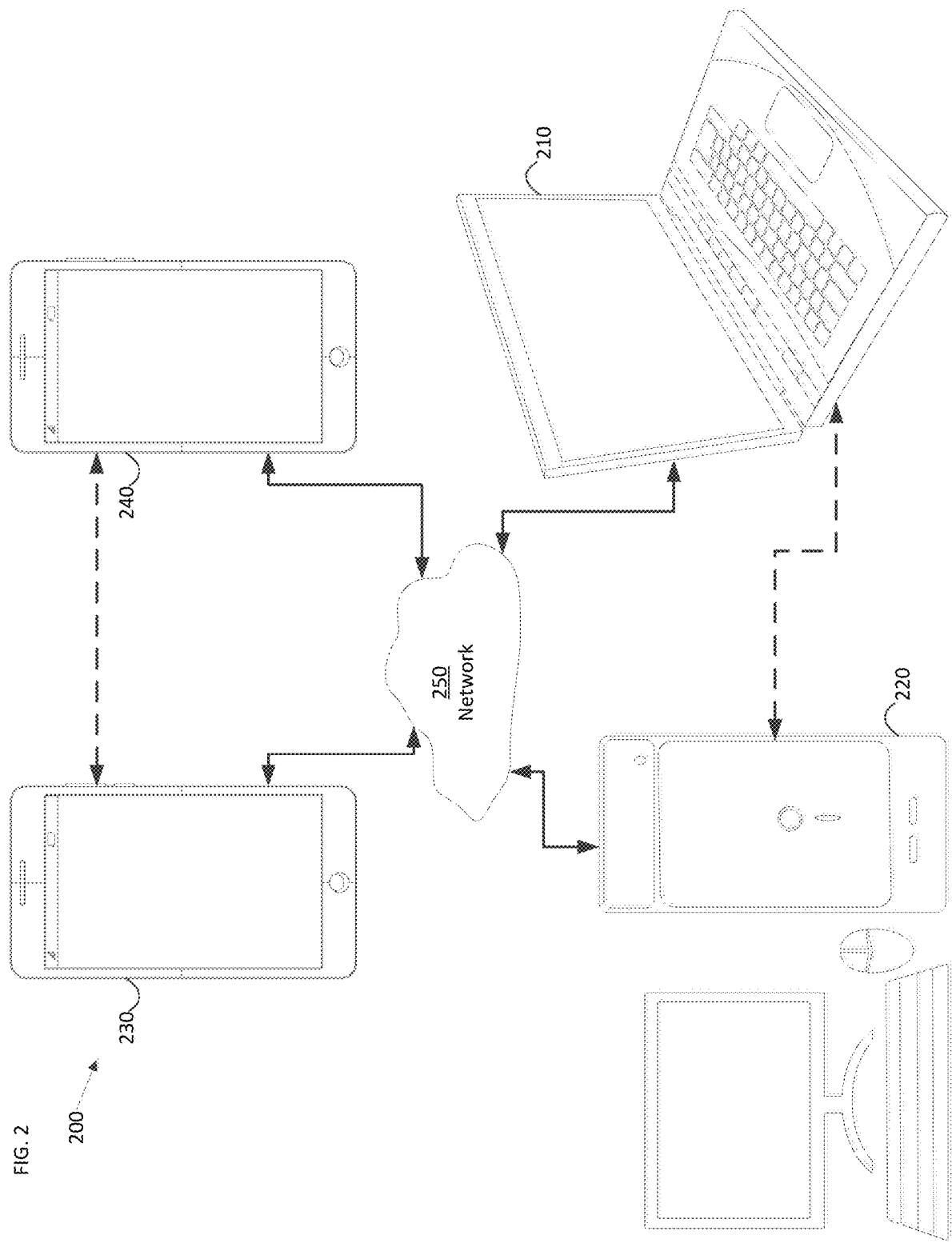
FIG. 2 is a schematic illustration of a simplified block diagram of a communication system in accordance with an embodiment.

FIG. 2 is a schematic illustration of a simplified block diagram of a communication system (200) in accordance with an embodiment. The system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of the disclosure may be not so limited. Embodiments of the disclosure find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the disclosure unless explained herein below.

Figure 3:
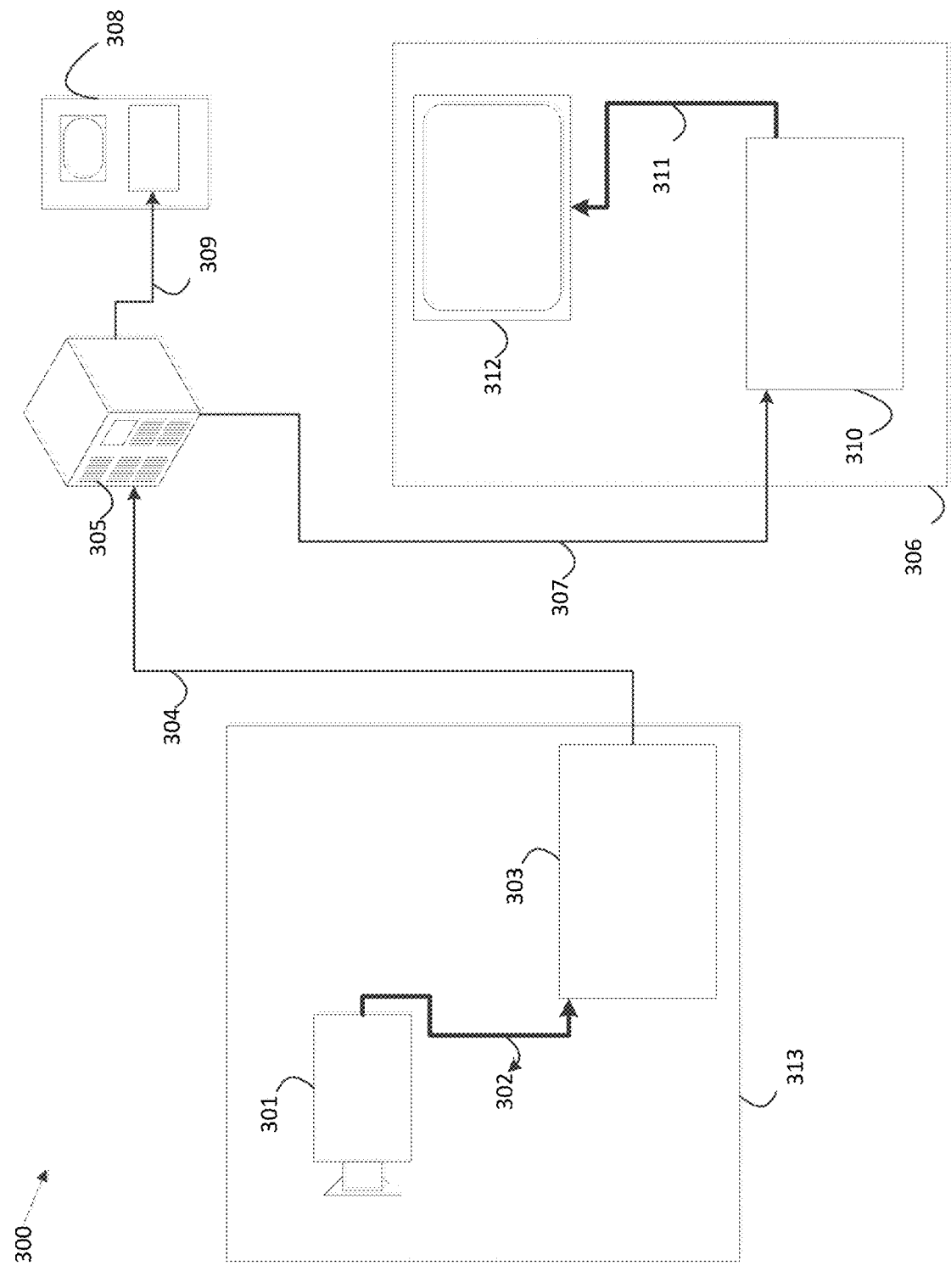
FIG. 3 is a schematic illustration of a simplified block diagram of a placement of a video encoder and a video decoder in a streaming system, in accordance with an embodiment.

FIG. 3 is a schematic illustration of a simplified block diagram of a placement of a video encoder (303) and a video decoder (310) in a streaming system (300), in accordance with an embodiment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating a for example uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) that decodes the incoming copy of the encoded video bitstream (307) and creates an outgoing video sample stream (311) that can be rendered on a display (312) or other rendering device. In some streaming systems, the video bitstreams (304, 307, 309) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

The communication system (200) or streaming system of FIG. 3 can be extended to enable the use of 360 video.

Figure 4:
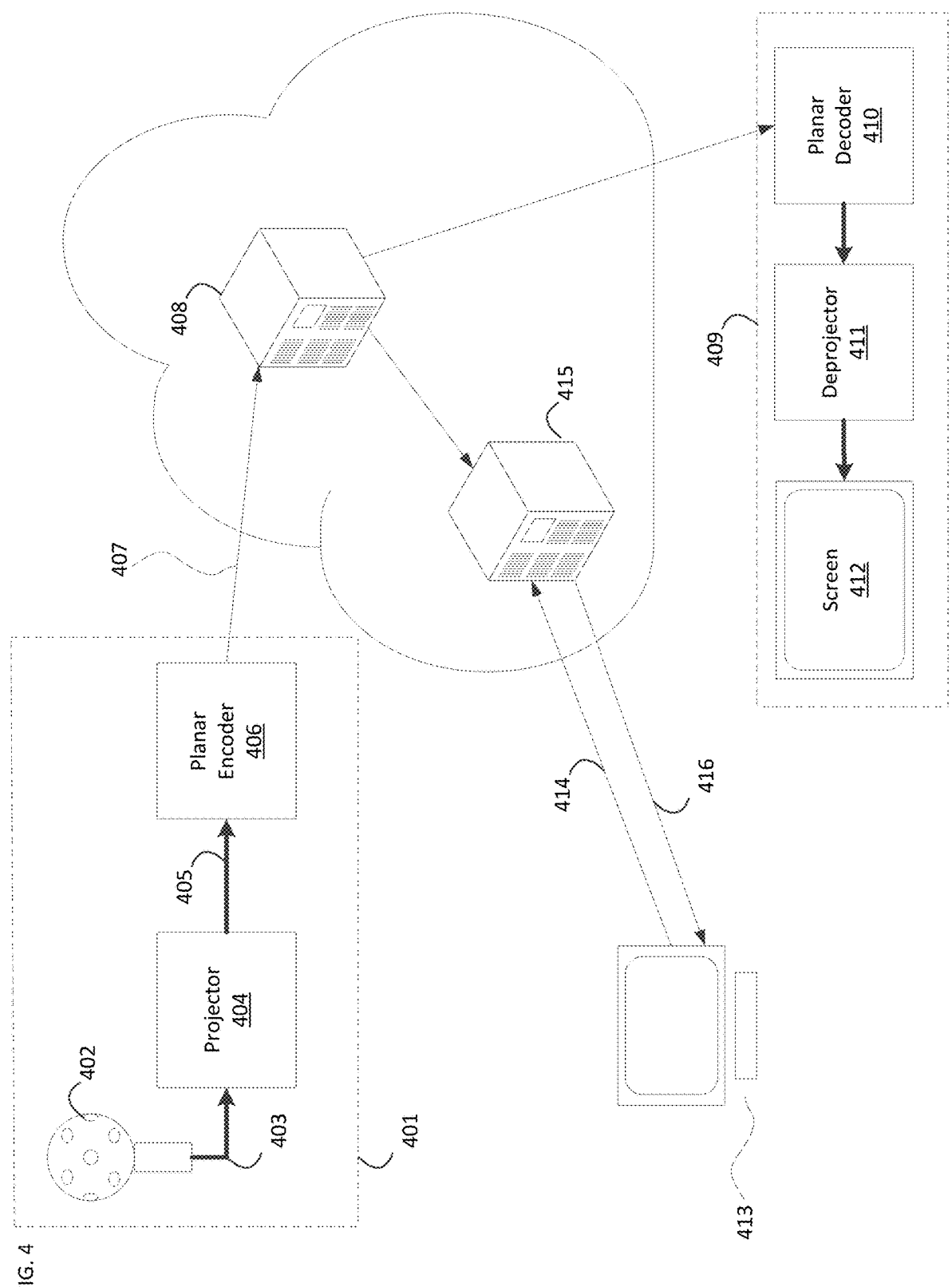
FIG. 4 is a schematic illustration of a simplified block diagram of a 360 communication/streaming system in accordance with an embodiment.

FIG. 4 is a schematic illustration of a simplified block diagram of a 360 communication/streaming system in accordance with an embodiment. Referring to FIG. 4, a layout of such a 360 system can be as follows. The 360 video capture unit (401) can include a 360 capable video camera (402) and a projector (404) that projects the incoming 360 images (403) into planar images (405). The 360 images (403) and the planar images (405) are depicted as boldface arrow so to emphasize the high data rate when compared to compressed signals, such as the coded video sequences (407). The planar images can be converted by a planar encoder (406) into one or more coded video sequences (407) that can also include side metainformation related, for example, to the projection that was generated by or obtained from the projector (404). The coded video sequences (407) can be forwarded directly to a decoder/renderer over a network, or can be stored on a streaming server (408). The streaming server (408) can stream the coded video sequences directly to a 360 video capable endpoint (409), which can include a (planar) decoder (410) and a deprojector (411). The deprojector (411) can, for example inverse the projection introduced by projector (404) such that one or more image sequences are formed that are suitable for display, for example, by a device such as virtual reality goggles, pseudo-3D capable screens (412), and the like. The deprojector may be controlled by a user interface that allows the user to select a viewing angle, viewpoint, and the like. This data flow can require the full 360 video presentation, as projected and compressed by projector (404) and encoder (406), to be streamed to the 360 capable endpoint (409).

As an alternative or in addition, in some cases a receiving endpoint may not have the connectivity or the computational resources to perform the decoding of all data required to reconstruct the full 360 degree scene, or the inverse projection. In such cases, a traditional (non-360 capable) endpoint (413) can send meta-information (414), obtained for example from its user interface, related to the viewpoint, to a 360 processor (415) located in the network. The 360 processor can perform the tasks of the 360 capable endpoint based on the meta information obtained, and then re-encode in a traditional (planar-optimized) encoder the rendered planar video (416) for consumption by the traditional endpoint (413). In such a scenario, the computationally heavy decoding of the 360 scene and the inverse projection can be offloaded into cloud-based resources like the 360 processor (415). As described, the 360 processor can act as a transcoder in that it has both decompression and compression mechanisms.

In embodiments, all or some of processing methods described herein may be performed in the network, e.g., the 360 processor (415). The 360 processor (415) may receive compressed or raw video or images from 360 video capture unit (401), and further process the received video or images. In these embodiments, the 360 processor (415) may be a local node or controller of a local network such as a surveillance system, or may be a network node such as a server.

In some cases, some of the 360 data, when properly formed and appropriately marked, can be removed by a Selective Forwarding Unit (SFU). If, for example, the projection format is cube projection, then, for any given viewpoint, at least three and up to five of the six planar square representations are not required for rendering (a non-transparent source sphere assumed). A properly configured SFU that is aware of the viewpoint, for example because it has received metadata such as the one the 360 processor (415) is using, can omit forwarding the unnecessary 360 data, assuming that the bitstream is properly formed, for example through the use of slices, tiles, layers, views, and so forth. Such a SFU can be viewed as a lightweight transcoder that does not include some of the signal processing technologies a full transcoder can require.

Figure 5:
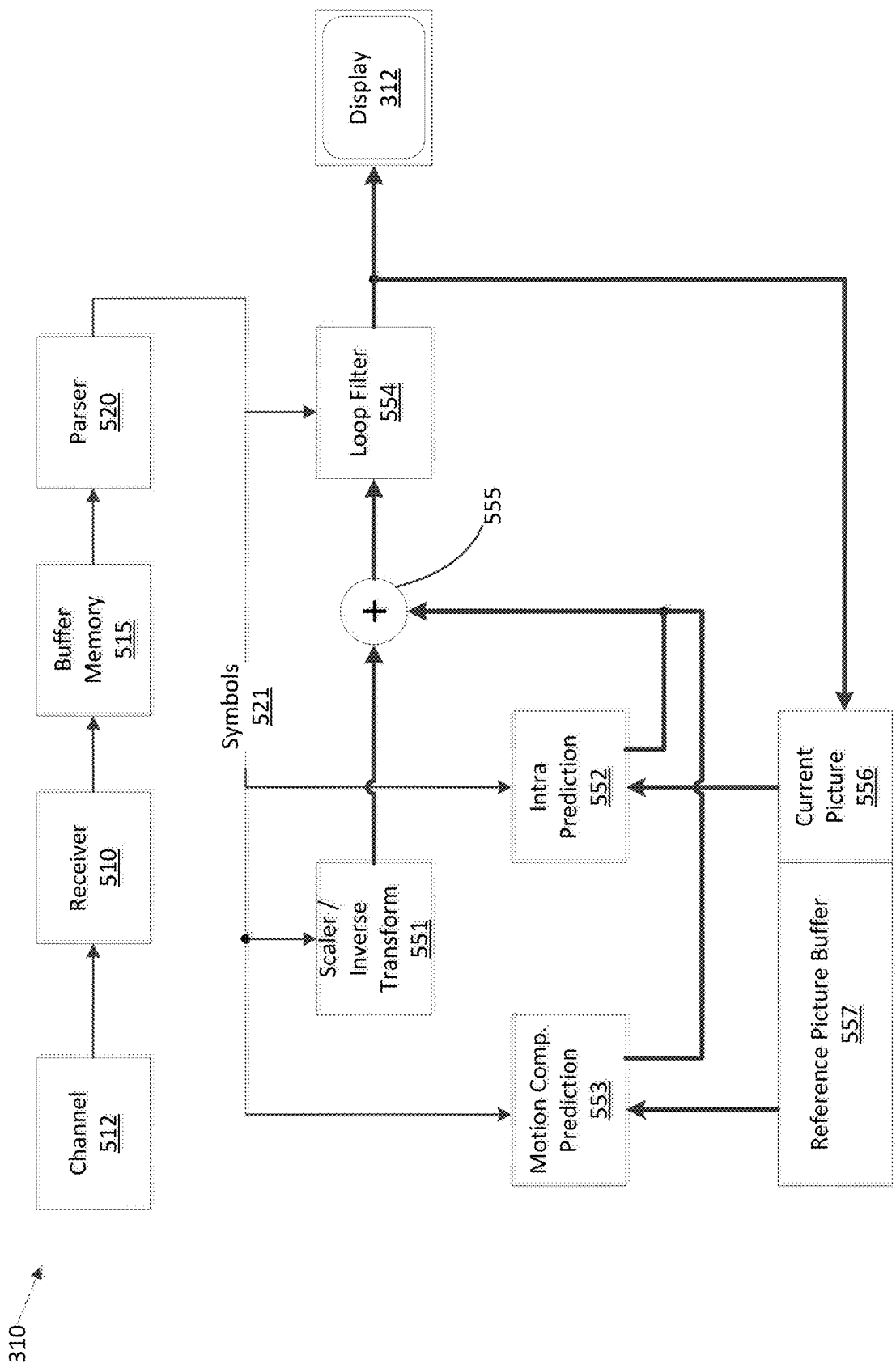
FIG. 5 is a schematic illustration of a simplified block diagram of a video decoder in accordance with an embodiment.

FIG. 5 is a schematic illustration of a simplified block diagram of a video decoder (310) in accordance with an embodiment.

A receiver (510) may receive one or more codec video sequences to be decoded by the decoder (310); in the same or another embodiment, one coded video sequence at a time, and the decoding of each coded video sequence is independent from other coded video sequences. The coded video sequence may be received from a channel (512), which may be a hardware/software link to a storage device that stores the encoded video data. The receiver (510) may receive the encoded video data with other data, for example, coded audio data and/or ancillary data streams that may be forwarded to their respective using entities. The receiver (510) may separate the coded video sequence from the other data. To combat network jitter, a buffer memory (515) may be coupled in between receiver (510) and entropy decoder/parser (520) ("parser" henceforth). When receiver (510) is receiving data from a store/forward device of sufficient bandwidth and controllability, or from an isosychronous network, the buffer (515) may not be needed, or can be small. For use on best effort packet networks such as the Internet, the buffer (515) may be required, can be comparatively large and can advantageously of adaptive size.

The video decoder (310) may include a parser (520) to reconstruct symbols (521) from the entropy coded video sequence. Categories of those symbols include information used to manage operation of the decoder (310), and potentially information to control a rendering device such as a display (312) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments. The parser (520) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (520) may extract from the coded video sequence, a set of subgroup parameters for any one or any combination of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser (520) may perform entropy decoding/parsing operation on the video sequence received from the buffer (515), so to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives quantized transform coefficient as well as control information, including that transform to use, block size, quantization factor, quantization scaling matrices, etc. as symbol(s) (521) from the parser (520). It can output blocks including sample values that can be input into aggregator (555).

In some cases, the output samples of the scaler/inverse transform (551) can pertain to an intra coded block; that is: a block that is not using predictive information from previously reconstructed pictures but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current (partly reconstructed) picture (556). The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a Motion Compensation Prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (521) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (555) can be subject to various loop filtering techniques in the loop filter unit (554). Video compression technologies can include in-loop filter technologies that are controlled by parameters included in the coded video bitstream and made available to the loop filter unit (554) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (554) can be a sample stream that can be output to the render device (312) as well as stored in the reference picture memory (556) for use in future inter-picture prediction.

Certain coded pictures, once fully reconstructed, can be used as reference pictures for future prediction. Once a coded picture is fully reconstructed and the coded picture has been identified as a reference picture (by, for example, parser (520)), the current reference picture (556) can become part of the reference picture buffer (557), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also may be necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (510) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or SNR enhancement layers, redundant slices, redundant pictures, forward error correction codes, and so on.

Figure 6:
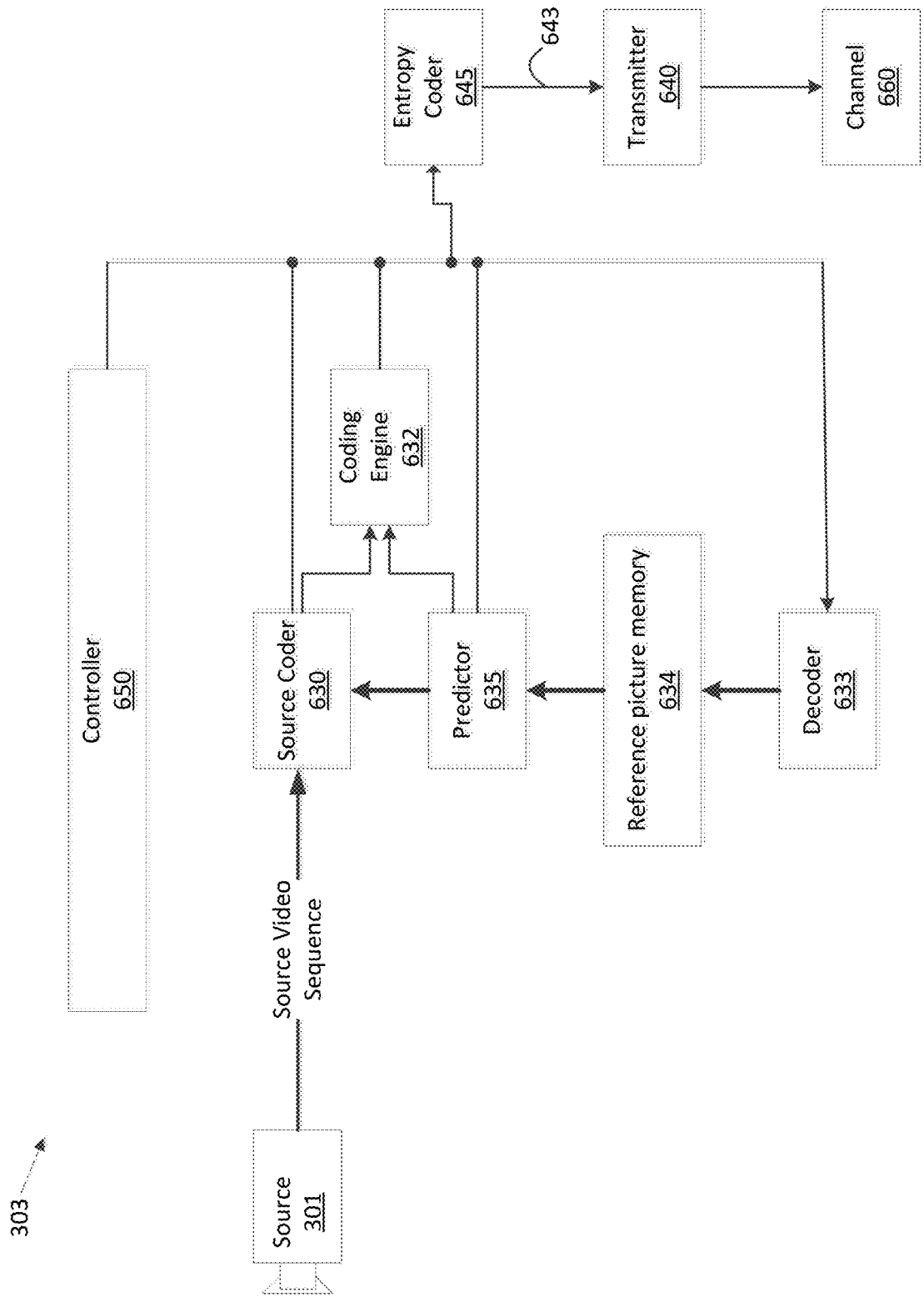
FIG. 6 is a schematic illustration of a simplified block diagram of a video encoder in accordance with an embodiment.

FIG. 6 is a schematic illustration of a simplified block diagram of a video encoder (303) in accordance with an embodiment.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (303) may be a camera that captures local image information as a video sequence. Video data may be provided as a plurality of individual pictures that impart motion when viewed in sequence. The pictures themselves may be organized as a spatial array of pixels, wherein each pixel can include one or more sample depending on the sampling structure, color space, etc. in use. A person skilled in the art can readily understand the relationship between pixels and samples. The description below focusses on samples.

According to an embodiment, the encoder (303) may code and compress the pictures of the source video sequence into a coded video sequence (643) in real time or under any other time constraints as required by the application. Enforcing appropriate coding speed is one function of controller (650). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (650) as they may pertain to video encoder (303) optimized for a certain system design.

Some video encoders operate in what a person skilled in the are readily recognizes as a "coding loop". As an oversimplified description, a coding loop can consist of the encoding part of an encoder (630) ("source coder" henceforth) (responsible for creating symbols based on an input picture to be coded, and a reference picture(s)), and a (local) decoder (633) embedded in the encoder (303) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (634). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (633) can be the same as of a "remote" decoder (310), which has already been described in detail above in conjunction with FIG. 5.

Briefly referring also to FIG. 5, however, as symbols are available and en/decoding of symbols to a coded video sequence by entropy coder (645) and parser (520) can be lossless, the entropy decoding parts of decoder (310), including channel (512), receiver (510), buffer (515), and parser (520) may not be fully implemented in local decoder (633).

An observation that can be made at this point is that any decoder technology except the parsing/entropy decoding that is present in a decoder also may need to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description may be required and provided below.

As part of its operation, the source coder (630) may perform motion compensated predictive coding, which codes an input frame predictively with reference to one or more previously-coded frames from the video sequence that were designated as "reference frames". In this manner, the coding engine (632) codes differences between pixel blocks of an input frame and pixel blocks of reference frame(s) that may be selected as prediction reference(s) to the input frame.

The local video decoder (633) may decode coded video data of frames that may be designated as reference frames, based on symbols created by the source coder (630). Operations of the coding engine (632) may advantageously be lossy processes. When the coded video data may be decoded at a video decoder, the reconstructed video sequence typically may be a replica of the source video sequence with some errors. The local video decoder (633) replicates decoding processes that may be performed by the video decoder on reference frames and may cause reconstructed reference frames to be stored in the reference picture cache (634). In this manner, the encoder (303) may store copies of reconstructed reference frames locally that have common content as the reconstructed reference frames that will be obtained by a far-end video decoder (absent transmission errors).

The predictor (635) may perform prediction searches for the coding engine (632). That is, for a new frame to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the video coder (630), including, for example, setting of parameters and subgroup parameters used for encoding the video data.

Output of all aforementioned functional units may be subjected to entropy coding in the entropy coder (645). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (640) may buffer the coded video sequence(s) as created by the entropy coder (645) to prepare it for transmission via a communication channel (660), which may be a hardware/software link to a storage device that would store the encoded video data. The transmitter (640) may merge coded video data from the video coder (630) with other data to be transmitted, for example, coded audio data and/or ancillary data streams.

The controller (650) may manage operation of the encoder (303). During coding, the controller (650) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The video coder (630) may include such data as part of the coded video sequence. Additional data may include temporal/spatial/SNR enhancement layers, other forms of redundant data such as redundant pictures and slices, Supplementary Enhancement Information (SEI) messages, Visual Usability Information (VUI) parameter set fragments, and so on.

When coding or decoding samples from a planar video source, all samples can represent approximately the same angular interval of a projection plane perpendicular to the axis of capture and in a sufficient distance, as measured from the camera's viewpoint.

Figure 7:
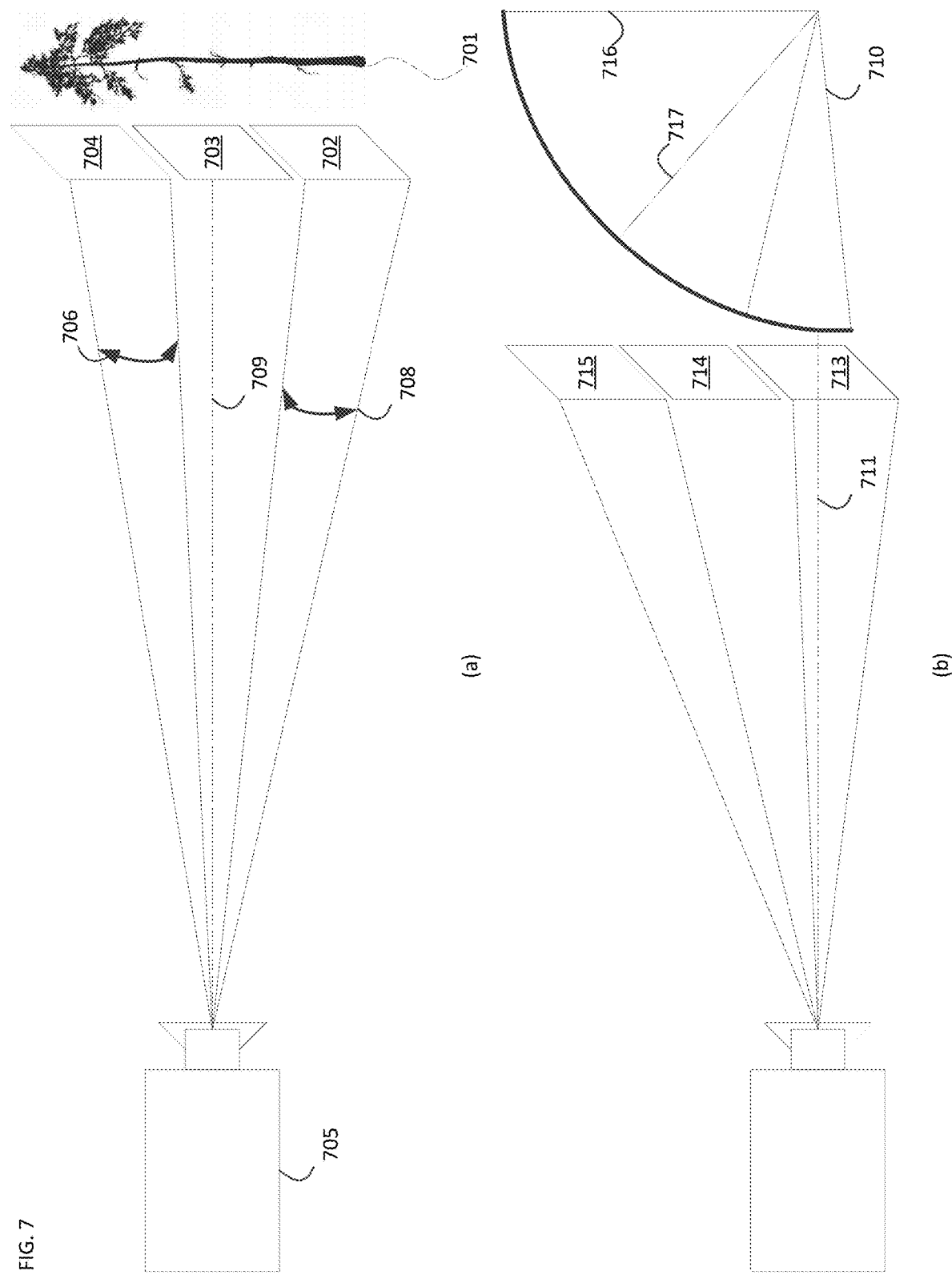
FIG. 7 is a schematic illustration of projections.

FIG. 7 is a schematic illustration of projections. Referring to portion (a) of FIG. 7, as an example, consider the vertical dimension of a projected surface (701), divided in to sample (702, 703, 704), that is captured by camera (705). The sample sizes are drawn out of proportion; in a real system, the vertical resolution of a camera can be 720, 1080, or more samples and not only three. It can be observed that the angular interval (706, 708) representing the samples are approximately the same. Assuming the scene being reasonably flat and approximately perpendicular to the axis of capture (709), the samples (702, 703, 704) are also of approximately the same size. This relationship is known since the advent of photography and lenses for cameras can be designed to create this relationship as close as possible, even under circumstances that may require optical correction, such as a close distance of the camera to the scene being captured in relation to the size of the scene.

Referring to portion (b) of FIG. 7, consider now the capture of a scene that is a sphere (710) (only one quarter of the sphere is depicted) using a simplified representation of an equirectangular projection, with only one dimension depicted. Assume the axis of capture (711) is perpendicular to the equator of the sphere. Shown are three samples (713, 714, 715) with identical angular width. Intuitively, it seems clear that samples close to the equator represent considerably less surface area of the sphere than samples responsible for depicting polar areas. For example, consider sample 715, which represents the northernmost latitudes of the sphere. Its related surface area, shown through dividers (716, 717) is considerably larger than the surface area related to sample 713.

While above example may appear to be extreme, there are projections in common use, that, for practical applications, depict certain polar areas many times larger than warranted by surface area as measured on the sphere. See above for the "Greenland/Australia" example.

Figure 8:
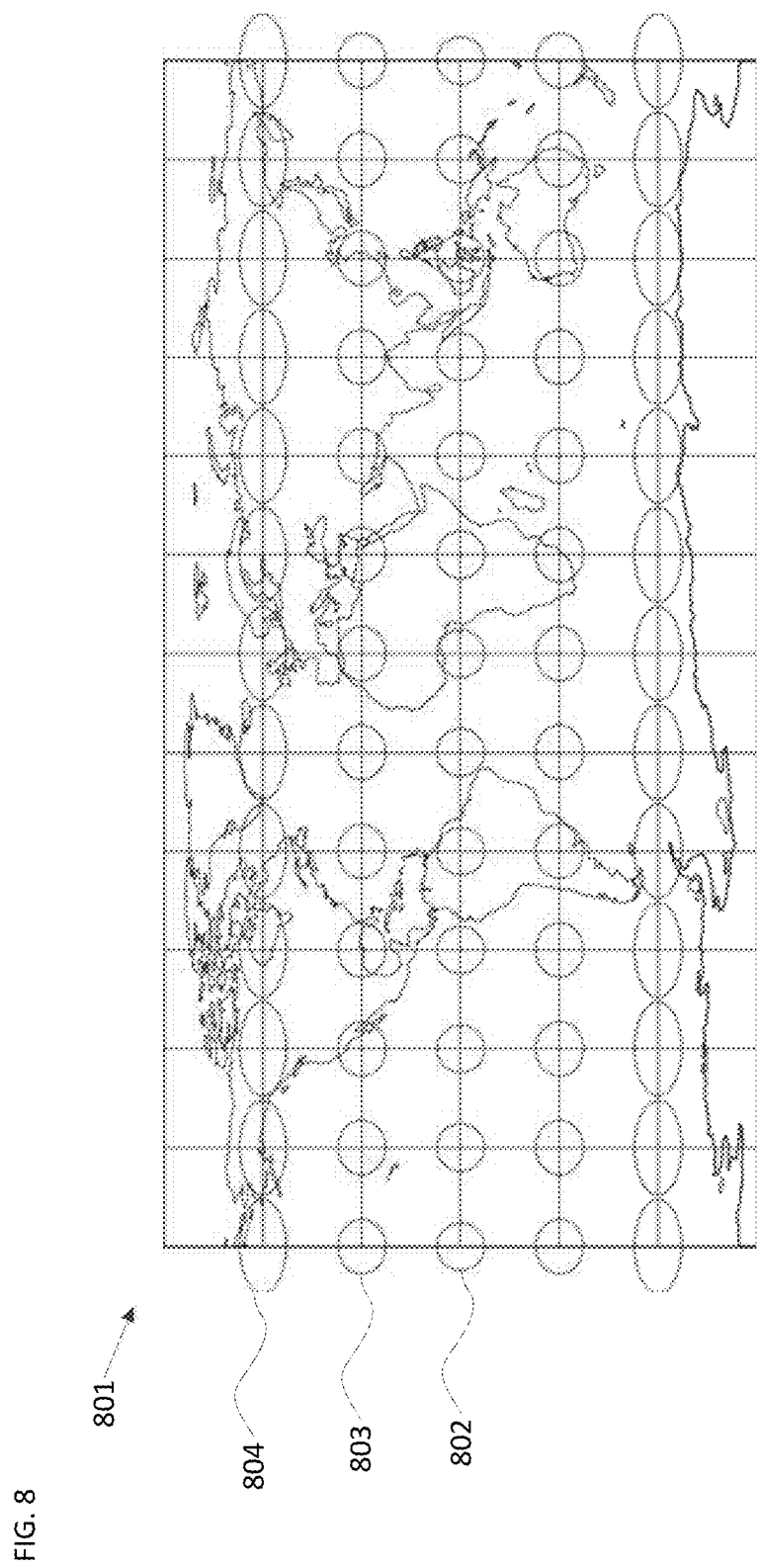
FIG. 8 is a schematic illustration of an equirectangular projection of the surface of earth with a Tissod Indicatrix.

FIG. 8 is a schematic illustration of an equirectangular projection of the surface of earth (801) with a Tissod Indicatrix. Shown is an example of the well-known Tissot's Indicatrix. Each ellipse (802, 803, 804) superimposed on the map represents a circular surface area on the globe. Assume the projection is represented by a sample map with identical sample size. Clearly, in the regions away from the equator, for example the region represented by ellipse (804), a lot more surface area in the projection, and therefore more samples, represents the same area on the globe's surface, then for example ellipse (802) on the equator.

Figure 9:
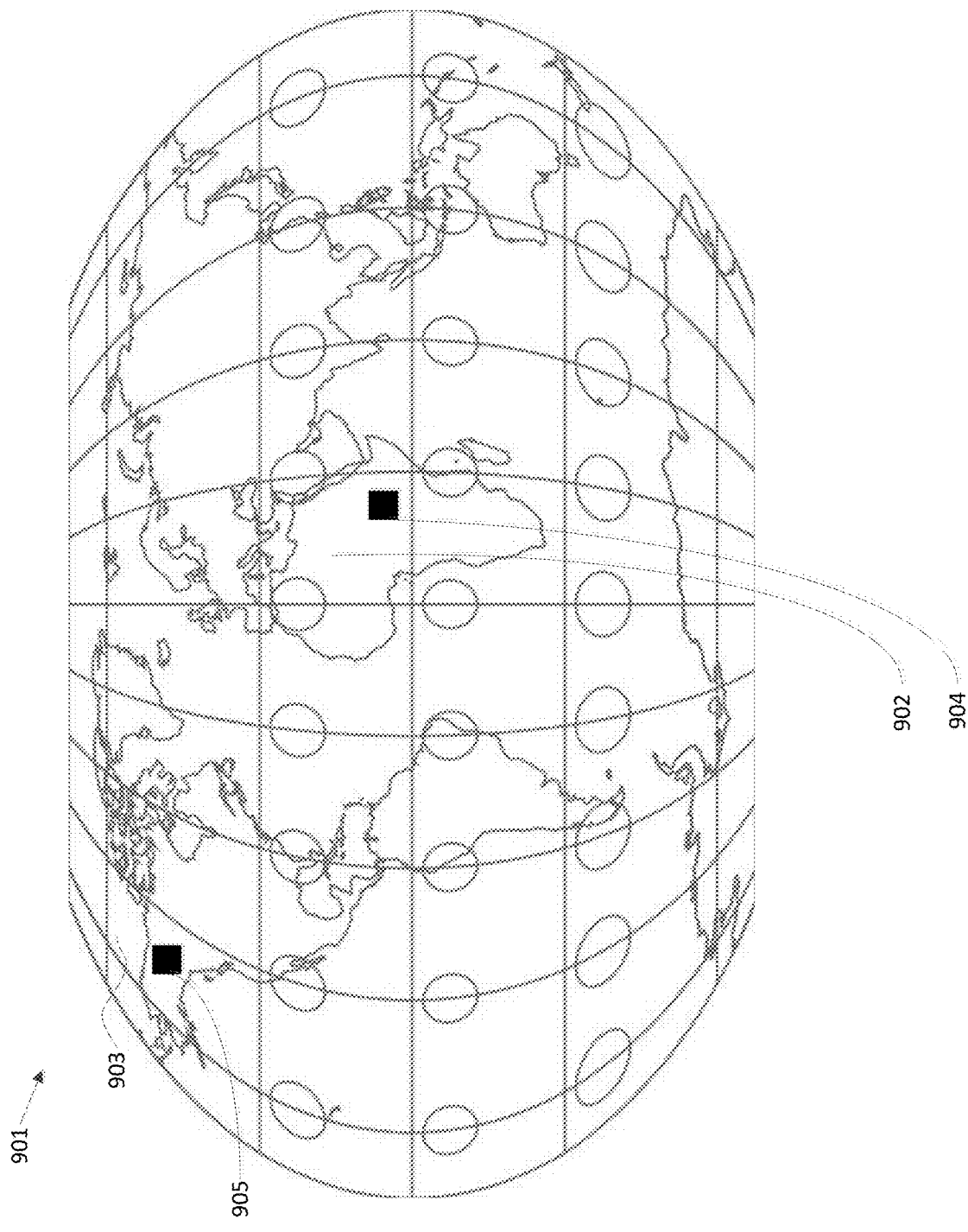
FIG. 9 is a schematic illustration of a Kravrayski-VII projection of the surface of earth.

FIG. 9 is a schematic illustration of a Kavrayskiy-VII projection (901) of the surface of earth, again overlaid with a Tissod Indicatrix. It also includes a few latitude and longitude "lines"; more specifically, lines of constant latitude or longitude, respectively. On the surface of the globe, each of the lines meets other lines at a right angle, and the surface distance between each meet point is assumed to be the same. Yet, in the projection, especially in certain polar regions as well as away from the meridian, the "square" surface areas are represented by non-square areas. Consider surface area (902), covering northern central Africa. Being close to both equator and the meridian, it is represented approximately (though not exactly) by a square. As an extreme counterexample, consider surface area (903), covering most of Alaska. The shape of this (approximately square, on the globe) surface area is grossly distorted. This is illustrated in FIG. 10.

Figure 10:
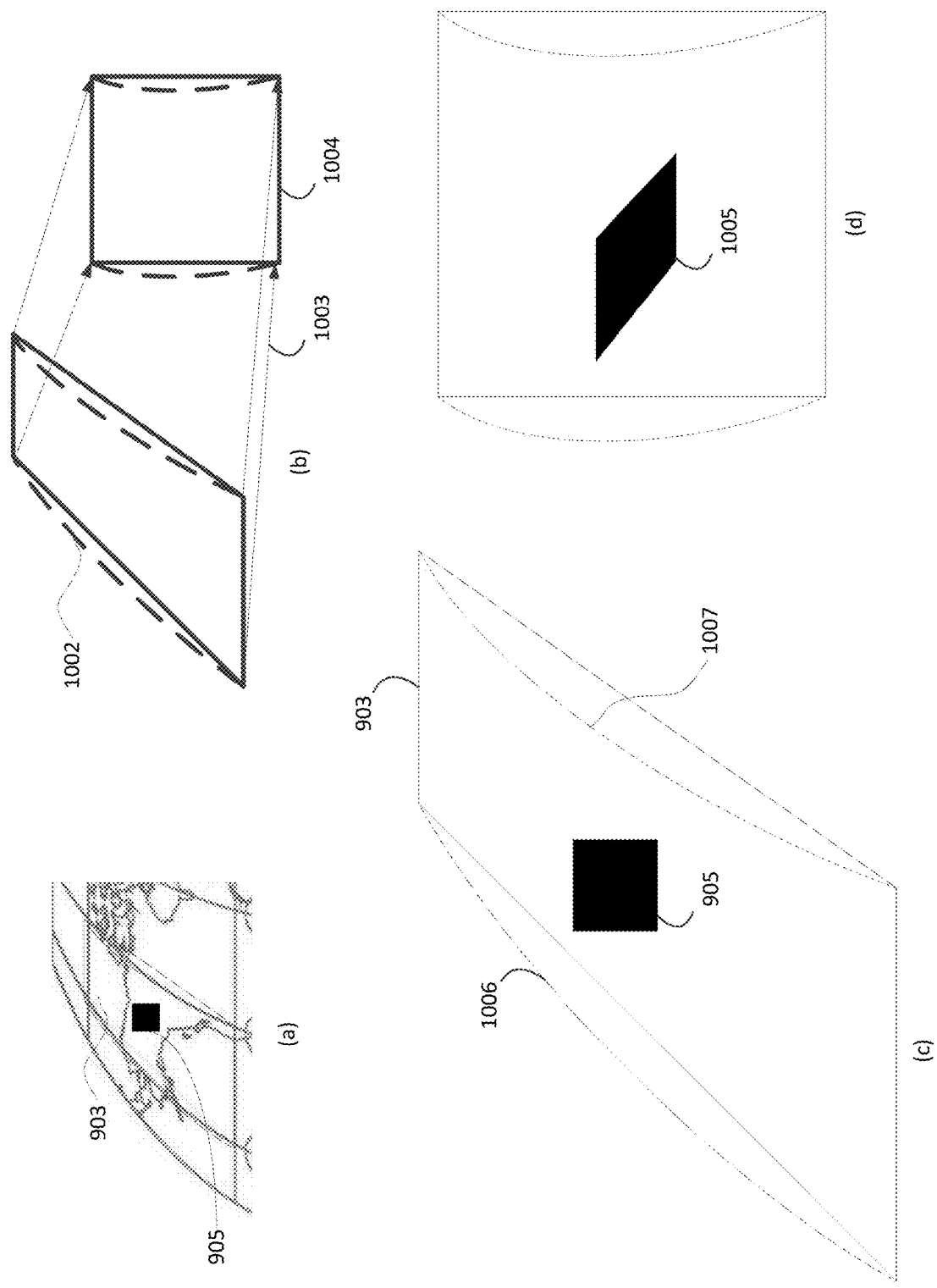
FIG. 10 is a schematic illustration of details of a projection in accordance with an embodiment.

FIG. 10 is a schematic illustration of details of a projection in accordance with an embodiment. Referring to portions (a) and (b) of FIG. 10, shown is an excerpt of the projection of FIG. 9 with only a small part of the northwestern hemisphere (903) depicted; therein a block of samples (905). The shape of the surface area (1002) can be reverse-projected (1003) into a square surface (1004) that is a close approximation of the surface area on the globe. At portions (c) and (d) of FIG. 10, the same surface area (903) and block (905) are projected as shown above. Note the non-square, distorted geometry of the (on the projection square) block (1005). Further note, that the reverse-projection of the block (905) to the distorted block (1005) is a simplification that simplifies the area (903) to a quadrangle. If the curved nature of the edges of the surface area in the projection (1006, 1007) were taken into account, the block (1005) would be even more distorted.

When, due to projection of a spherical scene onto a planar image used for compression, certain samples of that image represent considerably more surface area or angular width of the spherical scene, then those samples become more relevant for the faithful reproduction of the spherical scene after decompression and de-projection. Similarly, for example when using equirectangular projection, samples depicting equatorial regions of the sphere can be covering a comparatively small surface area, which makes them relatively less relevant for faithful reproduction of the spherical scene. Traditional image and video codecs optimized for planar images and videos to not necessarily address this inequality. Further, consider the lines of equal latitude or longitude. On the surface of a sphere, these lines are straight. In the projection, the lines are curved.

One observation that has to be made is that a planar encoder may well have information on the nature and properties of the projection in use. Also, in a practical system design, this information may need to be made known to the de-projector as well, for example though the bitstream. Without such information, a de-projector may not be able to meaningfully operate on the sample stream produced by the planar decoder. As both encoder and decoder systems can easily obtain side information about the projection in use (that may necessarily have to be transmitted from sending to receiving system so to enable the de-projector to inverse-project the scene as created by the projector), the video coding itself does not need to code that information again; the encoder can assume a priori knowledge of it by the decoder. Of course, that side information may also be included in the video bitstream, in which case there may not be a need to send it otherwise.

Figure 11:
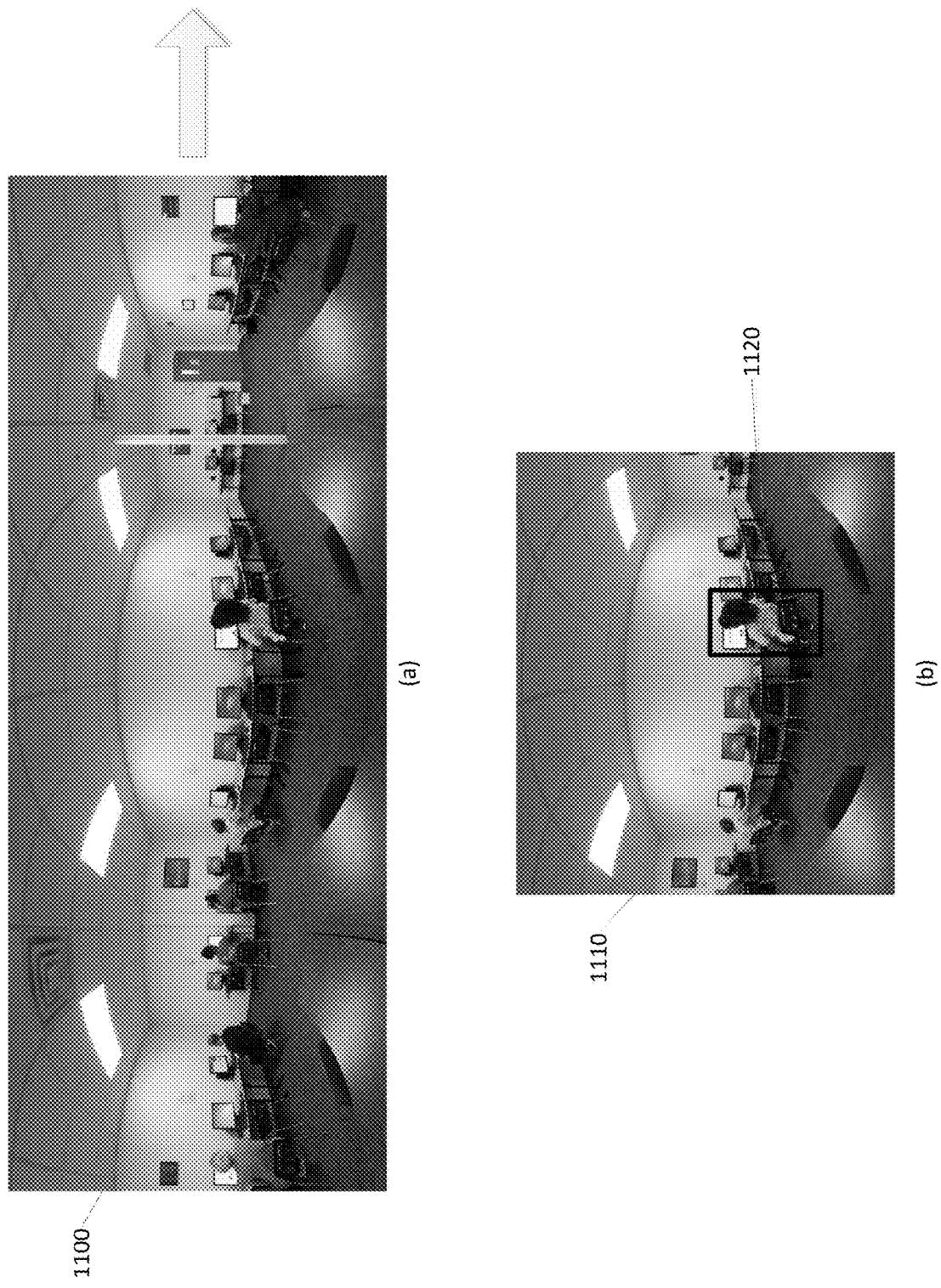
FIG. 11 is a diagram illustrating a method of processing a 360 degree video, according to an embodiment.

FIG. 11 is a diagram illustrating a method of processing a 360 degree video (1100), according to an embodiment.

Referring to portions (a) and (b) of FIG. 11, the 360 degree video (1100) can be cropped, by a video processing system, to generate a cropped video (1110) having a narrow angle view or a target viewing area targeting one or more persons or objects of interests, e.g., a person (1120) of interest. The cropped video (1110) can be encoded at much fewer pixels, thus reducing a video transmission bandwidth requirement.

The persons or objects of interests can be determined based upon information or a setting of a remote viewer or user. For example, the remote viewer may be a parent interested in checking in on his or her child being video monitored in a day care facility. Login account information of the remote viewer for an application or website may be set to target the child. Alternatively or additionally, account settings of the remote viewer for the application or website may allow the remote viewer to target more than one child, and/or to selectively choose one or more children from a list.

In another example, in a video conference call including a 360 degree video, a remote viewer can select a person of interest on the other end of the video conference call, from the 360 degree video that is displayed. The video processing system can track the selected person during video streaming, and define the target viewing area, based upon the selected person in the 360 degree video. Additionally, an object can be selected and targeted in a similar process. Multiple remote viewers can login the video processing system, and in each view, one or more different persons or objects of interest can be selected and targeted, resulting in one or more different narrow angle views being generated and optimized respectively for the remote viewers.

The persons or objects of interests can be tracked by image recognition, which may include facial recognition, object recognition, text recognition, bar code image recognition, or any combination thereof. For example, a child can be targeted or tracked by facial recognition. A speaker can be targeted or tracked by a movement of lips, hand gestures, and/or body movements. Additionally, persons or objects can be targeted or tracked by the presence of two-dimensional (2D) bar codes on the persons or objects. In some cases, facial recognition on persons may be too inaccurate or too computer resource intensive, so image recognition on persons, based upon their clothing or identifiable object tags can be used to ease the target tracking. For example, if children in a 360 degree video all wear unique visible 2D bar codes and/or text on their clothing, the video processing system can track an individual child via such bar codes and/or text.

The target viewing area can be defined around the targeted persons or objects. A size of the target viewing area can be fixed or dynamically adjusted around the targeted persons or objects. A remote viewer or an user can also choose the size of the viewing area, using settings or an automatic processing algorithm. If more than one targeted person or object are selected, then the target viewing area can be chosen to be around all targets, or multiple separate target viewing areas can be defined respectively for the targets (one for each target) and a final video may be a grid of the multiple separate target viewing areas.

The cropped target viewing area can be encoded for an output video transmission to a remote viewer via a network. Video quality of the cropped target viewing area can be kept as close in quality as the original, while reducing a total number of image bits for the transmission.

Figure 12:
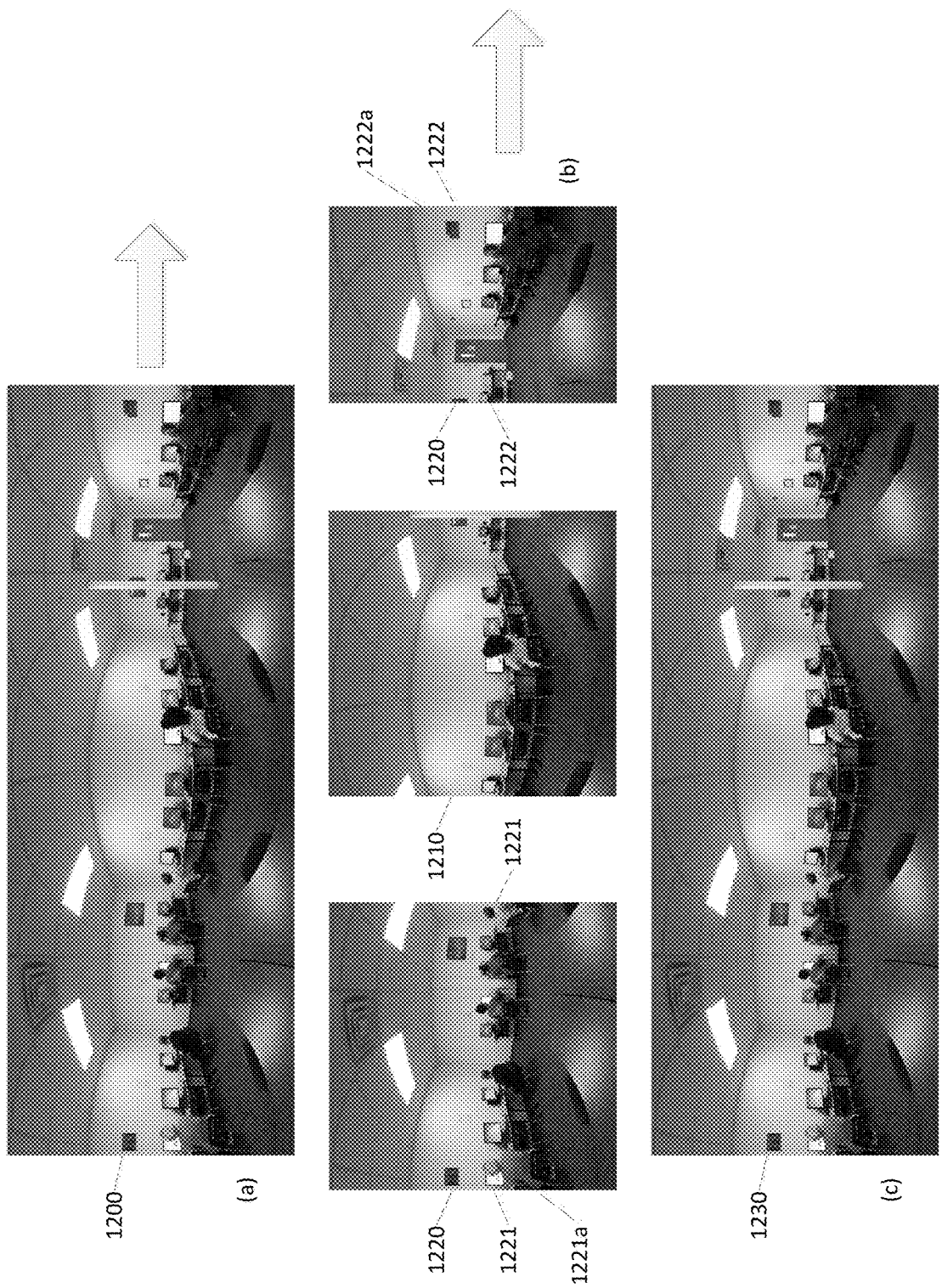
FIG. 12 is a diagram illustrating a method of processing a 360 degree video, according to another embodiment.

FIG. 12 is a diagram illustrating a method of processing a 360 degree video, according to another embodiment.

Referring to portions (a) and (b) of FIG. 12, a target viewing area may remain an entire 360 degree video view of the 360 degree video, but may be divided into a main viewing area (1210) and a peripheral viewing area (1220) in an output 2D view (1200). One or more portions of the peripheral viewing area (1220) may be cropped, or be kept for further processing. The peripheral viewing area may be defined by two vertical edges in the 360 degree video view that wraps around, and may be defined by left vertical edges (1221) and right vertical edges (1222) in the output 2D view (1200). A split edge (1221a or 1222a) can be defined as located at opposite of a center of the main viewing area (1210).

Then, referring to portion (c) of FIG. 12, a composite view (1230) can be made with the main viewing area (1210) that is corrected for distortions, is placed in a center of the composite view (1230), and is encoded with high image quality (similar or same image quality as the original 360 degree video). The composite view (1230) can further be made with the peripheral viewing area (1220) in its original distorted photo sphere view and compressed and encoded with lower image quality and fewer bits. In this manner, video quality in the main viewing area (1210) can be kept as close in quality as the original, while reducing a total number of image bits for transmission in the peripheral viewing area (1220).

The target viewing area (e.g., the cropped video (1110) of FIG. 11) or the main viewing area (1210) can be center aligned to one or more persons (1240) of interest or one or more objects of interest (to their center of gravity or their vertical line of gravity), as shown in FIG. 12. Alternatively, the target viewing area or the main viewing area (1210) can be offset from persons or objects of interest (to their center of gravity or their vertical line of gravity). For example, if a person of interest is facially recognized in the 360 degree video, and the person of interest is image recognized as having a head posture pointed to a direction (for example, above left or below right), then it is likely that the person of interest is looking at an object or person in that direction, and the target viewing area or the main viewing area (1210) may be expanded to be offset more in that direction (for example above left of below right). The offset may be determined or set based upon the head posture and/or a body posture of the person of interest.

Correction of distortions in the target viewing area (e.g., the cropped video (1110) of FIG. 11) or the main viewing area (1210) can be performed by applying an image correction filter. Additionally, multiple sections of the target viewing area or the main viewing area (1210) may be separately corrected by applying the image correction filter separately to individual sections, along with different camera to object distance (or focal distance) settings. Then, the corrected sections of the target viewing area or the main viewing area (1210) are merged back to the single target viewing area or the single main viewing area (1210). The different camera to object distance (or focal distance) may be estimated via 2D image distance estimation techniques.

In embodiments, multiple frames of a 360 degree video (e.g., the 360 degree video (1100) of FIG. 11) may be obtained. Based on the obtained multiple frames, a background may be determined, in which one or more objects (e.g., a wall in the 360 degree video (1100)) are stable over time. Further based on the obtained multiple frames, a foreground or one or more foreground elements may be determined, in which the foreground elements (e.g., the person (1120) of interest of FIG. 11) change over time.

The determined background of the obtained multiple frames may be processed or encoded to have a lower resolution and/or may be more compressed, and the determined foreground or foreground elements of the obtained multiple frames may not be processed, may be processed or encoded to have a higher resolution and/or may be less compressed, thus saving computational resources. The processed foreground or foreground elements may then be overlaid on the background to generate 360 degree video images (e.g., the composite view (1230) of FIG. 12). Further, the determined background image may be reused to generate 360 degree video frames (e.g., the composite view (1230) of FIG. 12), instead of determining and processing a new background of the obtained multiple frames, thus further saving computational resources.

Figure 13:
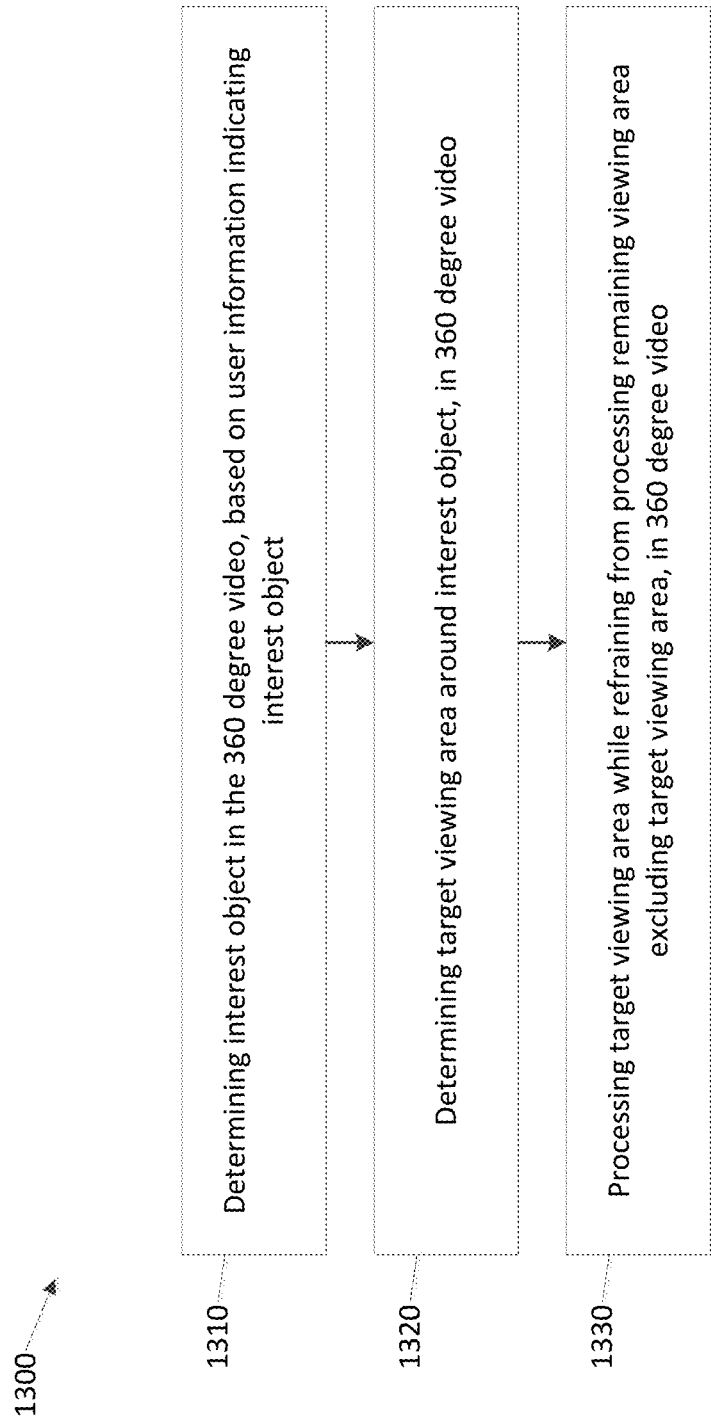
FIG. 13 is a flowchart illustrating a method of processing a 360 degree video, according to an embodiment.

FIG. 13 is a flowchart illustrating a method (1300) of processing a 360 degree video, according to an embodiment. In some implementations, one or more process blocks of FIG. 13 may be performed by the decoder (210). In some implementations, one or more process blocks of FIG. 13 may be performed by another device or a group of devices separate from or including the decoder (210), such as the encoder (203).

Referring to FIG. 13, in a first block (1310), the method (1300) includes determining an interest object in the 360 degree video, based on user information indicating the interest object.

The method (1300) may further include displaying the 360 degree video, receiving a selection of the interest object in the 360 degree video that is displayed, and setting the user information to indicate the interest object, based on the selection of the interest object being received.

The determining the interest object may include determining the interest object, further based on any one or any combination of facial recognition, object recognition, text recognition and bar code image recognition.

In a second block (1320), the method (1300) includes determining a target viewing area around the interest object, in the 360 degree video.

The determining the target viewing area may include determining an actual size of the target viewing area to be a predetermined size or based on the user information indicating the actual size.

A center of the target viewing area is aligned to the interest object, or the target viewing area is offset from a center of the interest object, based on a position of the interest object.

The method (1300) may further include determining a plurality of objects in the 360 degree video, based on the user information indicating the plurality of objects, and determining the target viewing area around the plurality of objects, in the 360 degree video.

In a third block (1330), the method (1300) includes processing the target viewing area while refraining from processing a remaining viewing area excluding the target viewing area, in the 360 degree video.

The processing the target viewing area may include cropping and encoding the target viewing area, from the 360 degree video, while refraining from encoding the remaining viewing area.

The processing the target viewing area may further include dividing the 360 degree video into the target viewing area and the remaining viewing area, based on the 360 degree video being divided, encoding the target viewing area with a higher image quality while encoding the remaining viewing area with a lower image quality, and merging the target viewing area and the remaining viewing area that are encoded.

The processing the target viewing area may further include dividing the 360 degree video into the target viewing area and the remaining viewing area, based on the 360 degree video being divided, correcting one or more first distortions in the target viewing area while refraining from correcting one or more second distortions in the remaining viewing area, and merging the target viewing area and the remaining viewing area that are corrected.

The method (1300) may further include determining a background of the 360 degree video, determining one or more foreground elements of the 360 degree video, and encoding the one or more foreground elements with a higher image quality, while encoding the background with a lower image quality.

The method (1300) may further include determining at least one new foreground element of the 360 degree video, and generating a composite view of the 360 degree video, using the at least one new foreground element and the encoded background.

Any one or any combination of the determining the interest object, determining the target viewing area and processing the target viewing area may be performed by one or more nodes in a network.

Although FIG. 13 shows example blocks of the method (1300), in some implementations, the method (1300) may include additional blocks, fewer blocks, different blocks, or differently arranged blocks than those depicted in FIG. 13. Additionally, or alternatively, two or more of the blocks of the method (1300) may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

Figure 14:
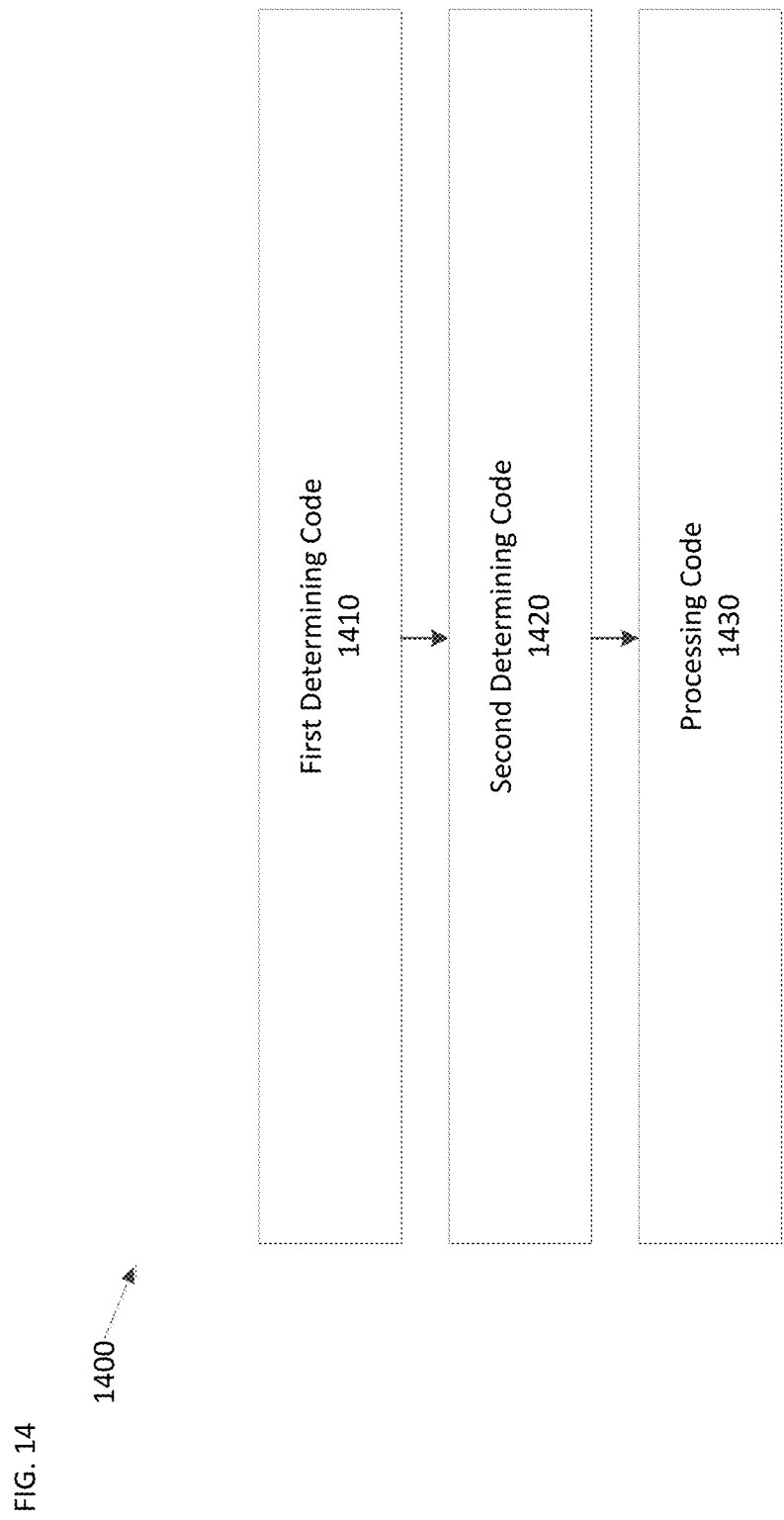
FIG. 14 is a simplified block diagram of an apparatus for processing a 360 degree video, according to an embodiment.

FIG. 14 is a simplified block diagram of an apparatus (1400) for processing a 360 degree video, according to an embodiment.

Referring to FIG. 14, the apparatus (1400) includes first determining code (1410), second determining code (1420), and processing code (1430).

The first determining code (1410) is configured to determine an interest object in the 360 degree video, based on user information indicating the interest object.

The first determining code (1410) may be further configured to control to display the 360 degree video, receive a selection of the interest object in the 360 degree video that is displayed, and set the user information to indicate the interest object, based on the selection of the interest object being received.

The first determining code (1410) may be further configured to determine the interest object, further based on any one or any combination of facial recognition, object recognition, text recognition and bar code image recognition.

The second determining code (1420) is configured to determine a target viewing area around the interest object, in the 360 degree video.

The second determining code (1420) may be further configured to determine an actual size of the target viewing area to be a predetermined size or based on the user information indicating the actual size.

A center of the target viewing area is aligned to the interest object, or the target viewing area is offset from a center of the interest object, based on a position of the interest object.

The first determining code (1410) may be further configured to determine a plurality of objects in the 360 degree video, based on the user information indicating the plurality of objects, and the second determining code (1420) may be further configured to determine the target viewing area around the plurality of objects, in the 360 degree video.

The processing code (1430) is configured to process the target viewing area while refraining from processing a remaining viewing area excluding the target viewing area, in the 360 degree video.

The processing code (1430) may be further configured to crop and encode the target viewing area, from the 360 degree video, while refraining from encoding the remaining viewing area.

The processing code (1430) may be further configured to divide the 360 degree video into the target viewing area and the remaining viewing area, based on the 360 degree video being divided, encode the target viewing area with a higher image quality while encoding the remaining viewing area with a lower image quality, and merge the target viewing area and the remaining viewing area that are encoded.

The processing code (1430) may be further configured to divide the 360 degree video into the target viewing area and the remaining viewing area, based on the 360 degree video being divided, correct one or more first distortions in the target viewing area while refraining from correcting one or more second distortions in the remaining viewing area, and merge the target viewing area and the remaining viewing area that are corrected.

The processing code (1430) may be further configured to determine a background of the 360 degree video, determining one or more foreground elements of the 360 degree video, and encode the one or more foreground elements with a higher image quality, while encoding the background with a lower image quality.

The processing code (1430) may be further configured to determine at least one new foreground element of the 360 degree video, and generate a composite view of the 360 degree video, using the at least one new foreground element and the encoded background.

Any one or any combination of the first determining code (1410), the second determining code (1420), and the processing code (1430) may be implemented in one or more nodes in a network.

The techniques for 360 image and video coding, described above, can be implemented as computer software using computer-readable instructions and physically stored in one or more computer-readable media.

Figure 15:
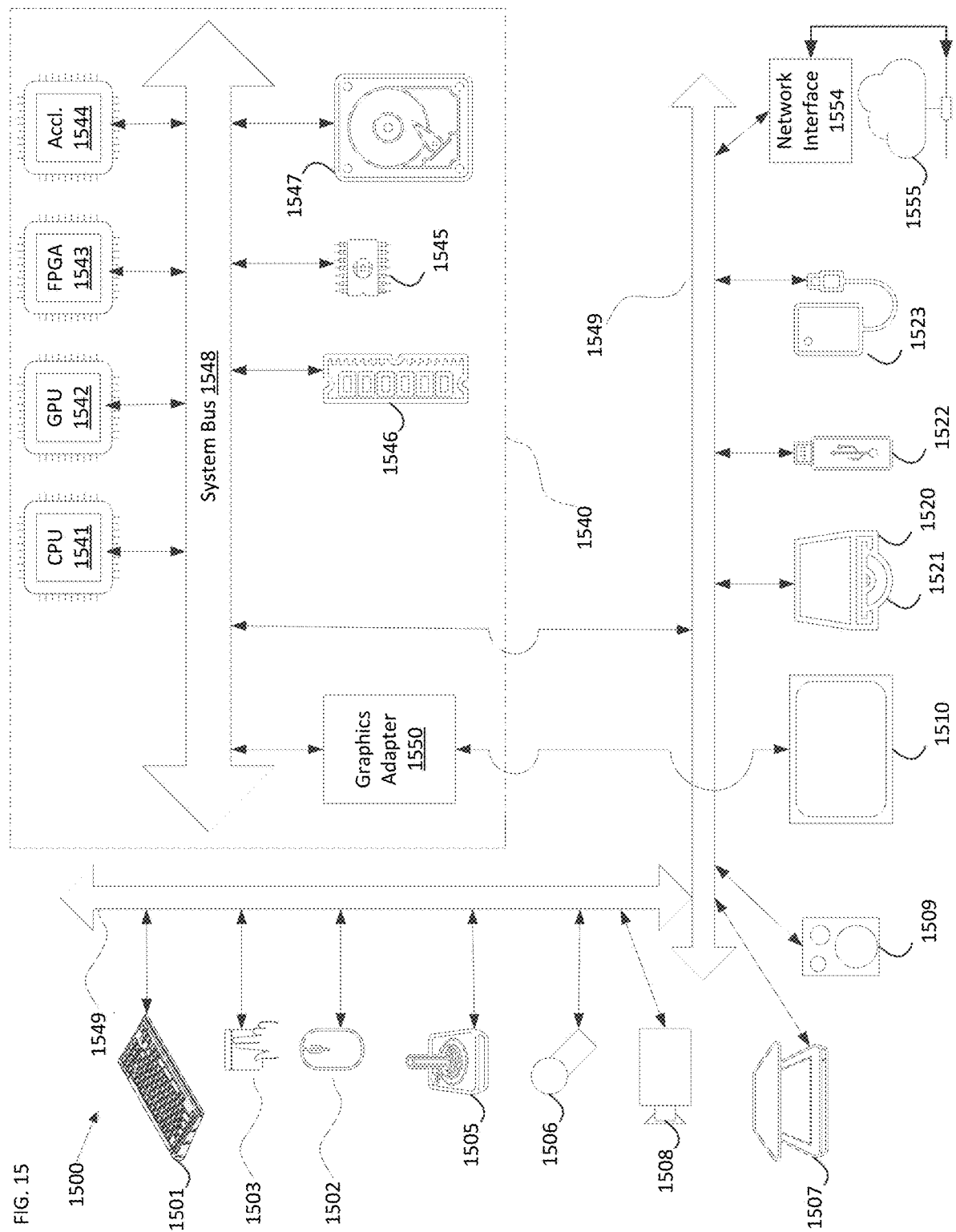
FIG. 15 is a schematic illustration of a computer system in accordance with an embodiment.

FIG. 15 is a schematic illustration of a computer system (1500) in accordance with an embodiment. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 15 for computer system (1500) are examples in nature and are not intended to suggest any limitation as to the scope of use or functionality of the computer software implementing embodiments of the disclosure. Neither should the configuration of components be interpreted as having any dependency or requirement relating to any one or combination of components illustrated in the embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input. The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (1504), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (1504), or joystick (1505), but there can also be tactile feedback devices that do not serve as input devices), audio output devices (such as: speakers (1509), headphones), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses, holographic displays and smoke tanks), and printers.

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc, specialized ROM/ASIC/PLD based devices such as security dongles, and the like.

Those skilled in the art may also understand that term "computer readable media" as used in connection with the presently disclosed subject matter does not encompass transmission media, carrier waves, or other transitory signals.

Computer system (1500) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The disclosure encompasses any suitable combination of hardware and software.

While this disclosure has described several embodiments, there are alterations, permutations, and various substitute equivalents, which fall within the scope of the disclosure. It will thus be appreciated that those skilled in the art will be able to devise numerous systems and methods that, although not explicitly shown or described herein, embody the principles of the disclosure and are thus within the spirit and scope thereof.

The invention claimed is:

1. A method of processing a 360 degree video, the method being performed by at least one processor, and the method comprising:
    determining an interest object in the 360 degree video, based on user information indicating the interest object;
    determining a target viewing area around the interest object, in the 360 degree video;
    dividing the 360 degree video into the target viewing area and a remaining viewing area excluding the target viewing area;
    based on the 360 degree video being divided, performing distortion correction in the target viewing area and not performing the distortion correction in the remaining viewing area; and
    merging the remaining viewing area in its original distorted sphere view and the target viewing area in which the distortion correction is performed, to obtain a single composite view image of the 360 degree video,
    wherein the determining the target viewing area comprises determining a posture of the interest object, and determining the target viewing area that is offset more in a direction of a perspective of the interest object, based on the posture of the interest object.

2. The method of claim 1, further comprising:
    displaying the 360 degree video;
    receiving a selection of the interest object in the 360 degree video that is displayed; and
    setting the user information to indicate the interest object, based on the selection of the interest object being received.

3. The method of claim 1, wherein the determining the interest object comprises determining the interest object, further based on any one or any combination of facial recognition, object recognition, text recognition and bar code image recognition.

4. The method of claim 1, wherein the determining the target viewing area comprises determining an actual size of the target viewing area to be a predetermined size or based on the user information indicating the actual size.

5. The method of claim 1, further comprising determining a plurality of objects in the 360 degree video, based on the user information indicating the plurality of objects,
    wherein the determining the target viewing area comprises determining the target viewing area around the plurality of objects, in the 360 degree video.

6. The method of claim 1, further comprising, based on the 360 degree video being divided, encoding the target viewing area with a higher image quality while encoding the remaining viewing area with a lower image quality,
    wherein the merging comprises merging the target viewing area and the remaining viewing area that are encoded and corrected, to obtain the single composite view image.

7. The method of claim 1, wherein a center of the target viewing area is aligned to the interest object.

8. The method of claim 1, further comprising:
    determining a background of the 360 degree video;
    determining one or more foreground elements of the 360 degree video; and encoding the one or more foreground elements with a higher image quality, while encoding the background with a lower image quality.

9. The method of claim 8, further comprising:
determining at least one new foreground element of the 360 degree video; and
generating a new composite view image of the 360 degree video, using the at least one new foreground element and the encoded background.

10. The method of claim 1, wherein the method is performed by one or more nodes in a network.

11. An apparatus for processing a 360 degree video, the apparatus comprising:
at least one memory configured to store computer program code; and
at least one processor configured to access the at least one memory and operate according to the computer program code, the computer program code comprising:
first determining code configured to cause the at least one processor to determine an interest object in the 360 degree video, based on user information indicating the interest object;
second determining code configured to cause the at least one processor to determine a target viewing area around the interest object, in the 360 degree video; and
processing code configured to cause the at least one processor to:
divide the 360 degree video into the target viewing area and a remaining viewing area excluding the target viewing area;
based on the 360 degree video being divided, perform distortion correction in the target viewing area and not performing the distortion correction in the remaining viewing area; and
merge the remaining viewing area in its original distorted sphere view and the target viewing area in which the distortion correction is performed, to obtain a single composite view image of the 360 degree video,
wherein the second determining code is further configured to cause the at least one processor to determine a posture of the interest object, and determine the target viewing area that is offset more in a direction of a perspective of the interest object, based on the posture of the interest object.

12. The apparatus of claim 11, wherein the first determining code is further configured to cause the at least one processor to:
control to display the 360 degree video;
receive a selection of the interest object in the 360 degree video that is displayed; and
set the user information to indicate the interest object, based on the selection of the interest object being received.

13. The apparatus of claim 11, wherein the first determining code is further configured to cause the at least one processor to determine the interest object, further based on any one or any combination of facial recognition, object recognition, text recognition and bar code image recognition.

14. The apparatus of claim 11, wherein the second determining code is further configured to cause the at least one processor to determine an actual size of the target viewing area to be a predetermined size or based on the user information indicating the actual size.

15. The apparatus of claim 11, wherein the first determining code is further configured to cause the at least one processor to determine a plurality of objects in the 360 degree video, based on the user information indicating the plurality of objects, and
wherein the second determining code is further configured to cause the at least one processor to determine the target viewing area around the plurality of objects, in the 360 degree video.

16. A non-transitory computer-readable storage medium storing instructions that cause a processor to:
determine an interest object in a 360 degree video, based on user information indicating the interest object;
determine a target viewing area around the interest object, in the 360 degree video;
divide the 360 degree video into the target viewing area and a remaining viewing area excluding the target viewing area;
based on the 360 degree video being divided, perform distortion correction in the target viewing area and not performing the distortion correction in the remaining viewing area; and
merge the remaining viewing area in its original distorted sphere view and the target viewing area in which the distortion correction is performed, to obtain a single composite view image of the 360 degree video,
wherein the instructions further cause the processor to determine a posture of the interest object, and determine the target viewing area that is offset more in a direction of a perspective of the interest object, based on the posture of the interest object.

* * * * *